United States Patent
Osterberg

(10) Patent No.: US 11,416,971 B2
(45) Date of Patent: Aug. 16, 2022

(54) ARTIFICIAL INTELLIGENCE BASED IMAGE QUALITY ASSESSMENT SYSTEM

(71) Applicant: Aizo Systems LLC, Haverhill, MA (US)

(72) Inventor: Jacob G. Osterberg, Haverhill, MA (US)

(73) Assignee: Aizo Systems LLC, Haverhill, MA (US)

( * ) Notice: Subject to any disclaimer, the term of this patent is extended or adjusted under 35 U.S.C. 154(b) by 68 days.

(21) Appl. No.: 17/106,613

(22) Filed: Nov. 30, 2020

(65) Prior Publication Data

US 2021/0166358 A1 Jun. 3, 2021

Related U.S. Application Data

(60) Provisional application No. 62/942,398, filed on Dec. 2, 2019.

(51) Int. Cl.
| | |
|---|---|
| *G06T 11/00* | (2006.01) |
| *G06T 5/00* | (2006.01) |
| *G06T 5/50* | (2006.01) |
| *G06T 7/143* | (2017.01) |
| *G06T 7/11* | (2017.01) |

(52) U.S. Cl.
CPC ............. *G06T 5/003* (2013.01); *G06T 5/50* (2013.01); *G06T 7/11* (2017.01); *G06T 7/143* (2017.01); *G06T 11/001* (2013.01); *G06T 2207/20081* (2013.01); *G06T 2207/20084* (2013.01)

(58) Field of Classification Search
CPC ... G06T 5/003; G06T 5/50; G06T 7/11; G06T 7/143; G06T 11/001; G06T 2207/20081; G06T 2207/20084; G06T 2207/20021; G06T 2207/30168; G06T 7/0004; G06T 2207/10024
See application file for complete search history.

(56) References Cited

U.S. PATENT DOCUMENTS 9,516,237 B1 * 12/2016 Goyal ................. H04N 5/2353
10,452,920 B2 * 10/2019 Kauffmann ............ H04N 5/147

* cited by examiner

*Primary Examiner* — Phuoc Tran
(74) *Attorney, Agent, or Firm* — Schwegman Lundberg & Woessner, P.A.

(57) ABSTRACT

A system or method may be used to perform image processing. An example method may include extracting a plurality of sub-images corresponding to a plurality of regions of an image. A rating classification may be generated, using a machine learning trained model, for each of the plurality of sub-images, for example including a no-rating classification for at least one sub-image of the plurality of sub-images. The method may include creating, using the rating classification for each of the plurality of sub-images, a color map overlay of a grayscale image corresponding to the image. The color map overlay may include colors corresponding to respective rating classifications for the plurality of regions or a region without a color corresponding to the at least one sub-image having the no-rating classification. The method may include outputting the color map overlaid on the grayscale image.

25 Claims, 15 Drawing Sheets
(4 of 15 Drawing Sheet(s) Filed in Color)

US 11,416,971 B2

ARTIFICIAL INTELLIGENCE BASED IMAGE QUALITY ASSESSMENT SYSTEM

CLAIM OF PRIORITY

This application claims the benefit of priority to U.S. Provisional Application No. 62/942,398, filed Dec. 2, 2019, titled "ARTIFICIAL INTELLIGENCE BASED IMAGE QUALITY ASSESSMENT SYSTEM," which is hereby incorporated herein by reference in its entirety.

BACKGROUND

Image processing may be used to determine attributes of an image. Images may have attributes, such as sharpness or blur, which may make the images suboptimal or difficult to use or enjoy. Often techniques used to determine image attributes are done manually by hand or by optical techniques with a known target in a lab resulting in inaccurate, unreproducible, or expensive results. Other image processing techniques may not be able to determine sharpness or blur for images.

BRIEF DESCRIPTION OF THE DRAWINGS

The patent or application file contains at least one drawing executed in color. Copies of this patent or patent application publication with color drawing(s) will be provided by the Office up on request and payment of the necessary fee.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
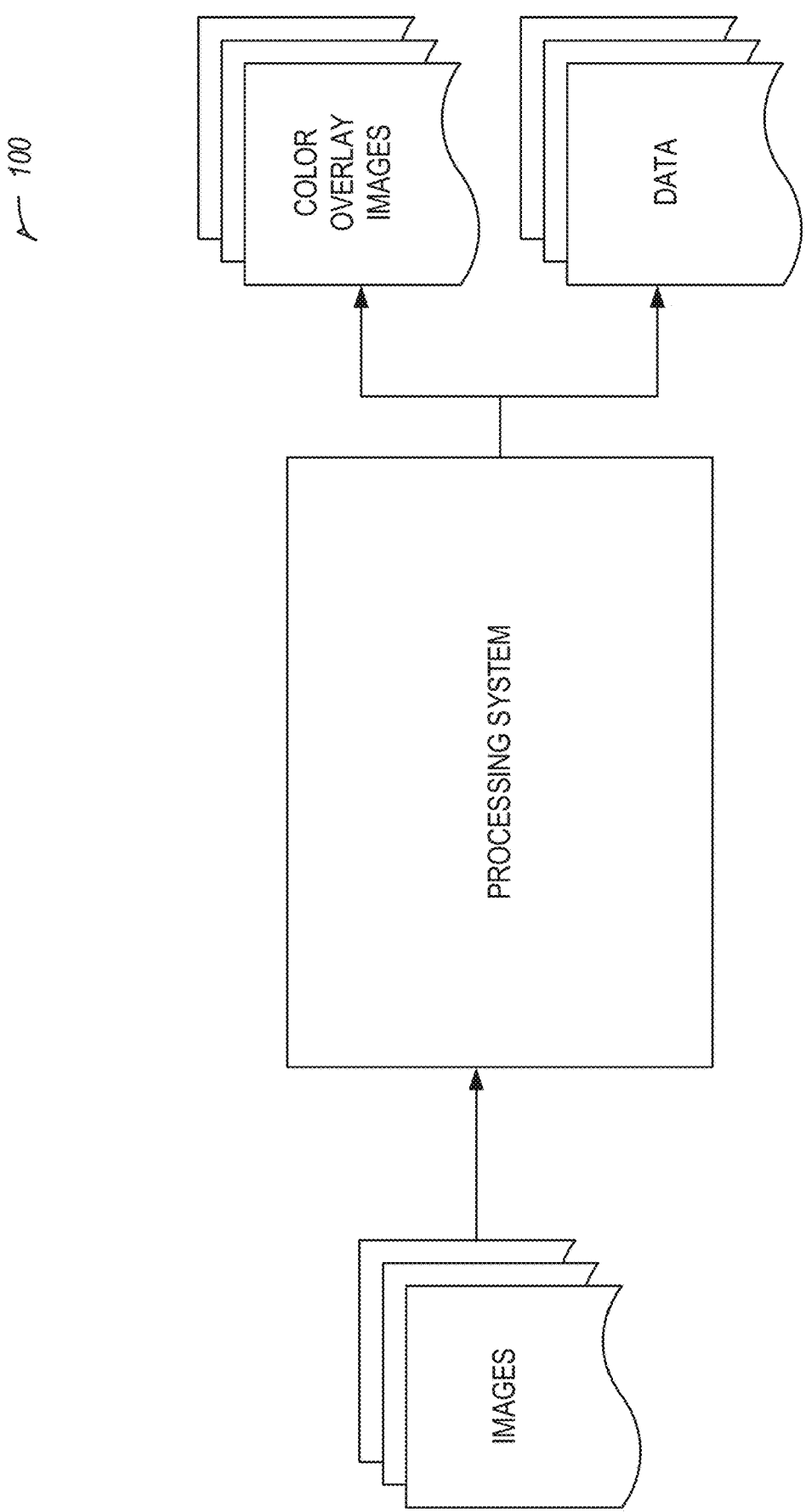
FIG. 1 illustrates a block diagram for processing images in accordance with some embodiments.

Systems and methods for determining image properties using a machine learning model are described herein. For example, an artificial intelligence (AI) based image processing system for estimating and outputting intuitive image quality metrics is described herein. The image quality metrics identified may include sharpness, blur, noise (e.g., signal-to-noise ratio (SNR)), detective quantum efficiency (DQE), etc. In an example, various outputs may be provided, such as a value metric (e.g., in a matrix, corresponding to sub-regions of an image), a color map (e.g., overlaid on a grayscale image corresponding to an input image), or the like.

A colored map may be output to show patterns not visible to the human eye (e.g., regions of defocus, lens sharpness fall-off, sharpness gradients, etc.) within an image. One metric may be a single value metric, such as a single value sharpness metric (SVSM). The SVSM is an absolute value that represents sharpness of an image or a portion of an image. The SVSM is an absolute value in that it may be compared across images or image portions (e.g., is not relative to the image), and does not require a reference target or image. Examples of SVSMs or other single value metrics that may be output by systems and methods described herein include metrics for assessing sharpness or blur, such as modulation transfer function 50 percent contrast spatial frequency (MTF50), a relative edge response (RER) metric, 10-90% edge response metric, or the like. Techniques described herein may be performed on compressed images or uncompressed images of varying formats. Images may be batched to generate outputs on sets of images.

The system and methods described herein may automatically ignore areas with minimal frequency content (e.g., areas that cannot be assessed). An output for an area without discernable content or for which a SVSM or other metrics cannot be determined may include a no-rating classification. Assigning a "no-rating" area reduces false ratings by limiting attempts to interpret data where accuracy is difficult, such as where frequency content is low. The SVSM output may include MTF50, RER, 10-90% edge response metrics from an edge spread function (e.g., output values have associated estimated scientific measurement, useful for additional calculations or techniques), line spread function full width half maximum (LSF FWHM), or the like. The output may include an intuitive or easy to understand display output with a color overlay that provides quick visual assessment with little or no user training needed.

The systems and methods described herein may be used to cull images from a set. For example, these systems and methods may be used to quickly sort through hundreds or thousands of photos to find the best image (e.g., the sharpest image, the image with highest sharpness value for a particular region, the image with the most divergence between foreground sharpness and background blur, the image with the fewest or smallest no-rating areas, or other user selected or identified objectives). The techniques described herein may rapidly assess absolute sharpness level without "pixel peeping."

In an example, the systems and methods described herein may be used for automatic photo quality control for industrial or business processes, such as sorting or identifying an optimal image (e.g., for microscopy, drone images, satellite images, factory images, security images, or the like). For example, the techniques may be used to detect when an imaging system has an issue (e.g., sharpness decreased due to introduced blur from lack of focus when camera is moved, or lens is dirty, etc.). In another example, a camera lens or sensor assessment may be performed using the image processing described herein. An output may include how well the optical system is performing. The techniques may be incorporated into other image processing apps or used with other image processing techniques, in an example.

FIG. 1 illustrates a block diagram 100 for processing images in accordance with some embodiments. The block diagram 100 illustrates, at a high level, an input image or images that are processed as described below to output a cover overlay image or data (e.g., a matrix representing sharpness values for sub-regions of an image). Input images may include images captured by a mobile device (e.g., a mobile phone), a high-end cinematic camera, a microscope system, a satellite sensor, or other image producing devices. The processing system uses a custom-built artificial intelligence (AI) network with advanced image processing techniques to analyze the image or images. Outputs may include a simple and intuitive color-coded image overlay that represents single value metrics at various areas of an image in a color map. In some examples, raw output data may be provided, such as for feeding into automated decision-making processes or more in-depth analysis.

Figure 2:
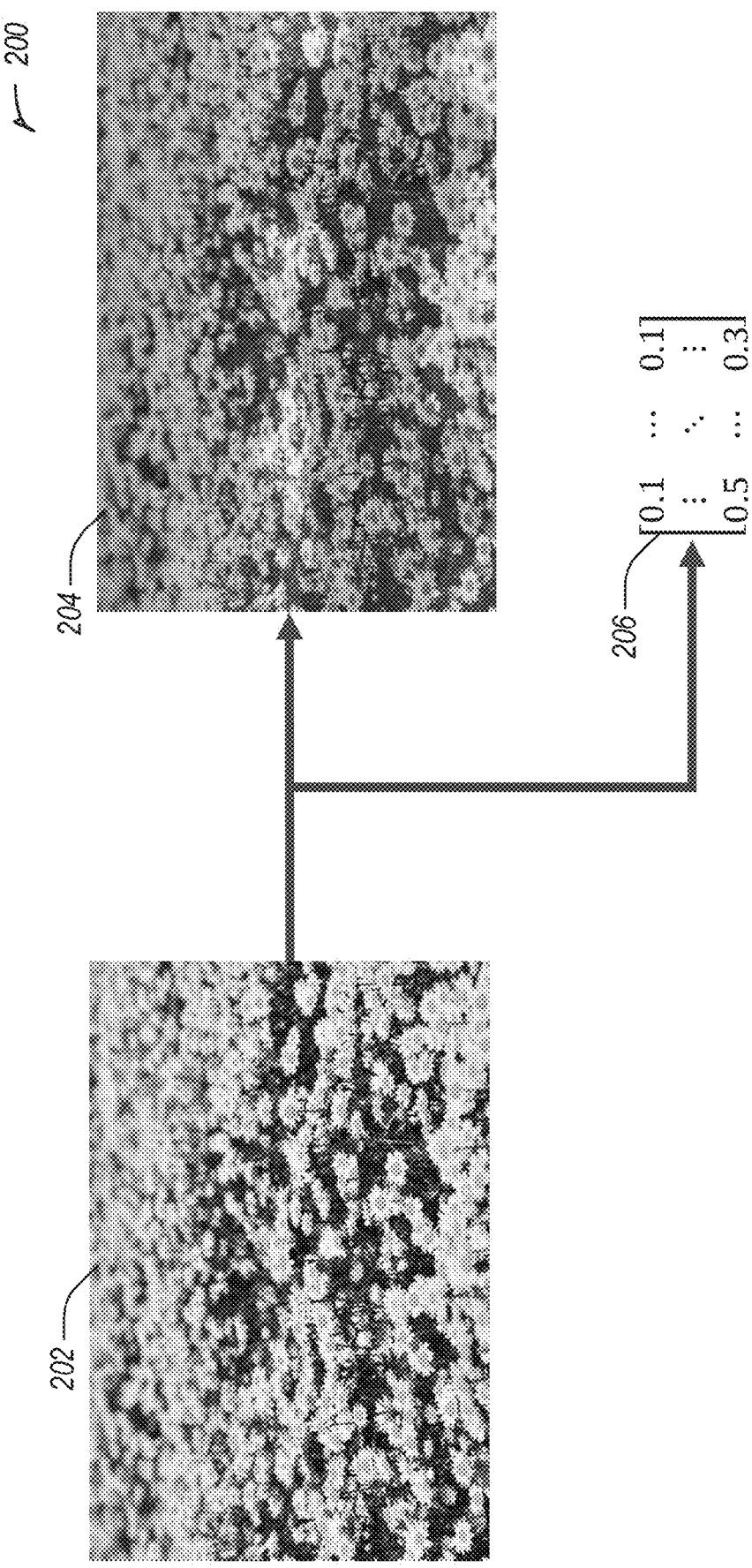
FIG. 2 illustrates an example input image and an example output image and output information in accordance with some embodiments.

FIG. 2 illustrates an example input image 202, an example output image 204, and output information 206 in accordance with some embodiments. The example input image 202 may have regions of varying sharpness or blur, which are represented in the example output image 204 by color coding. For example, the blue and purple colors represent sharper regions, while the red colors represent blurrier regions. The example input image 202 may include an image or a set of images (e.g., RGB, Grayscale, or Multi-band, such as .tif, .jpg, .png, etc.). The example output image 204 may include a color map overlaid on a grayscale image version of the example input image 202. In an example, the example output image 204 may be saved as a colorized overlay image (e.g., .png or .jpg) along with a grayscale version of the example input image 202. In another example, such as when the example input image 202 is already in grayscale, the colorized overlay image may be stored without a grayscale image. In yet another example, the example output image 204 may be saved as a single combined file with the grayscale image overlaid with the color overlay image.

The output information 206 may include sharpness values for regions of the example input image 202. The output information 206 may be saved as a matrix or table in a file, in some examples. The output information 206 may include a text-based summary (e.g., in a .txt or other text file format). In an example, an output matrix in the output information 206 may include a number of rated areas, which may be adjusted to meet processing time versus measurement density needs, or be a user selected number.

Figure 3:
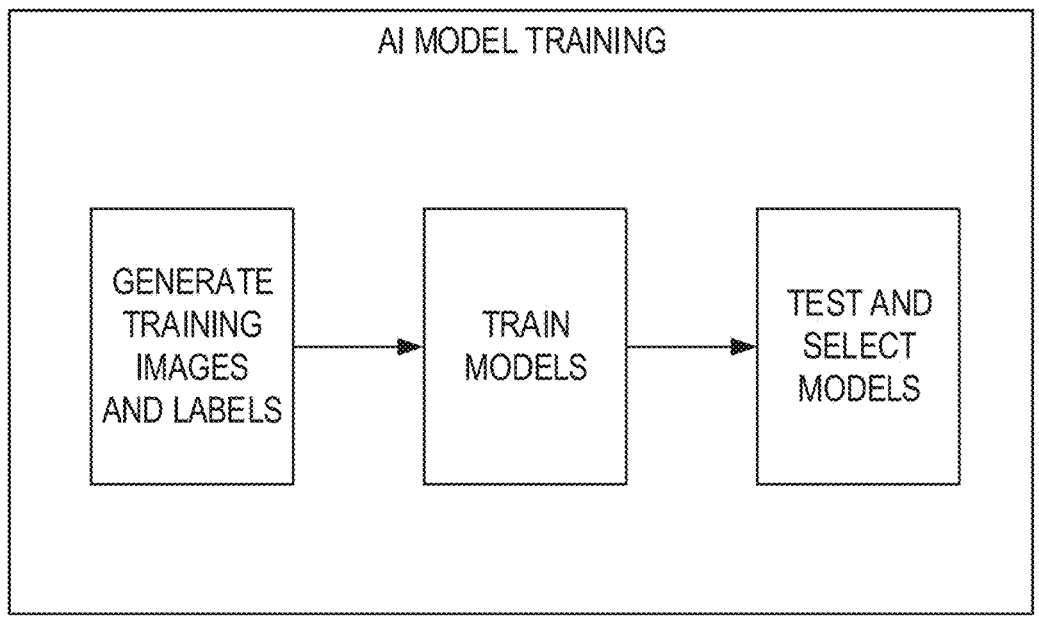
FIG. 3 illustrates a block diagram for model training in accordance with some embodiments.

FIG. 3 illustrates a block diagram 300 for model training in accordance with some embodiments. The block diagram 300 illustrates a model building technique for training an AI model. The AI training includes generating training images and labels, training a model (or models), and testing the model (or selecting a model from a set of trained models). Outputs may include an optical system blur model, a motion blur model, a sharpness model, a noise model, a distortion model, or the like. Blur types may include simulated blur, such as gaussian blur, circular blur, ring blur, linear blur, or the like. In addition to gaussian blur, circular blur, or ring blur kernels for blurring images, Fourier optics techniques may be used to simulate blur in optical systems via simulated point spread functions (PSFs). Simulating PSFs may result in improved models and system performance. Model training is described in further detail below.

Figure 4:
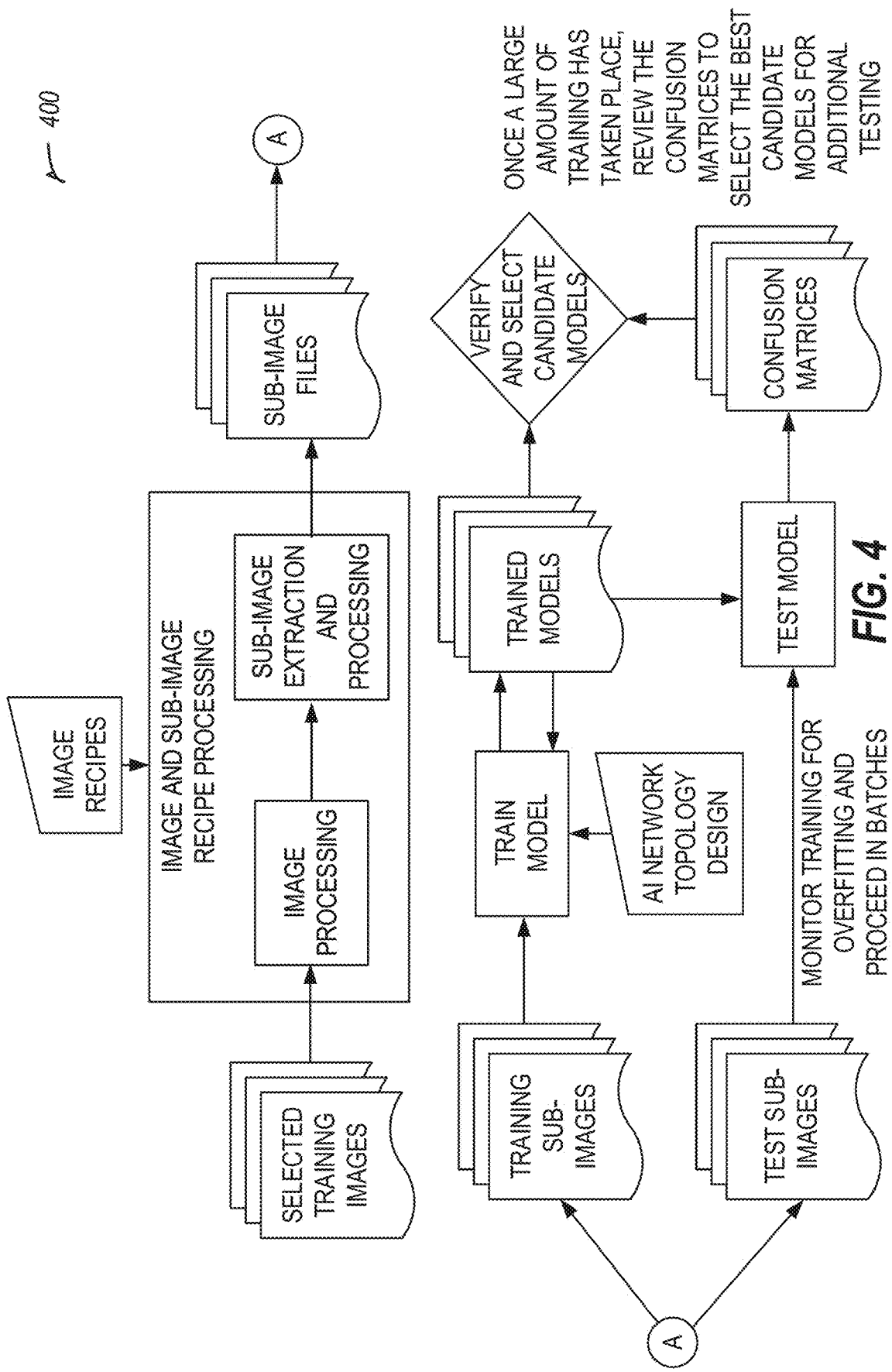
FIG. 4 illustrates a flowchart for model training in accordance with some embodiments.

FIG. 4 illustrates a flowchart 400 for model training in accordance with some embodiments. The flowchart 400 includes using a selected set of images, such as a relatively small set (e.g., 50-100 images or 100-plus images to further improve training) of RGB master training images. These images may be selected from a larger set of available images for their particular sharpness qualities. For example, the selected images may be visually verified to be in good focus across the entire image and include varying scene content. In an example, images may be selected such that frequency content is available everywhere in the image (e.g., so each sub-image contains at least a minimum amount of spatial variation). For example, images may be excluded where a no-rating classification applies to a particular region (e.g., avoiding images with defocus, lens aberrations, lens debris, or depth of field). If only a small blurry area exists in an image, that area may be cropped out before the process begins.

Typical machine learning techniques require thousands or millions of images to accurately train a model. Labeling training examples is time consuming and expensive, but not using a sufficient number of images typically causes the model to be poorly trained. The selected set of images used in the techniques described herein use a small initial set to generate millions of training images based on controlled image processing, resulting in a well-trained model. The small selected set of images may be labeled quickly compared to the potentially thousands or millions of images used in a typical machine learning training.

The selected images may be of any subject matter or type when the above conditions are met. The training set may be built from many difference sources of imagery. For specific applications, images from similar scene content may be sourced, but is not required. The images may be of any size and the sub-image algorithm may automatically adjust to differing image sizes. Simulated images may be added with randomly placed shapes at differing gray levels. Simulated images may be used to avoid noise or brightness level issues.

The flowchart 400 includes an operation to pre-process images. Pre-processing may include area downsampling the selected images, such as four-times to increase the per pixel sharpness (downsampling increases the MTF contrast relative to the pixel when viewing the MTF frequency in cycles per pixel). This impacts the noise level, but the benefit of pushing the MTF closer to an ideal value of 1 is worth the noise level change (later noise injection along with simulated low and high noise images may be used to counter the AI training on noise changes due to downsampling). The downsampling also may reduce the relative magnitude of small sharpness variations across different areas of the image.

After pre-processing, which may include cropping, labeled sub-region images files may be generated. These sub-region image files may be input to train the model with output sharpness values labeled for the sub-regions. This process is further described below. More than one model may be trained, such as for different types of blur or sharpness, and a candidate model may be selected from the set of models generated. For example, after training has taken place, confusion matrices corresponding to the models may be compared to select the best candidate models for additional testing. Training the model may include using testing images or sub-region images. Training may be monitored to prevent overfitting.

Figure 5:
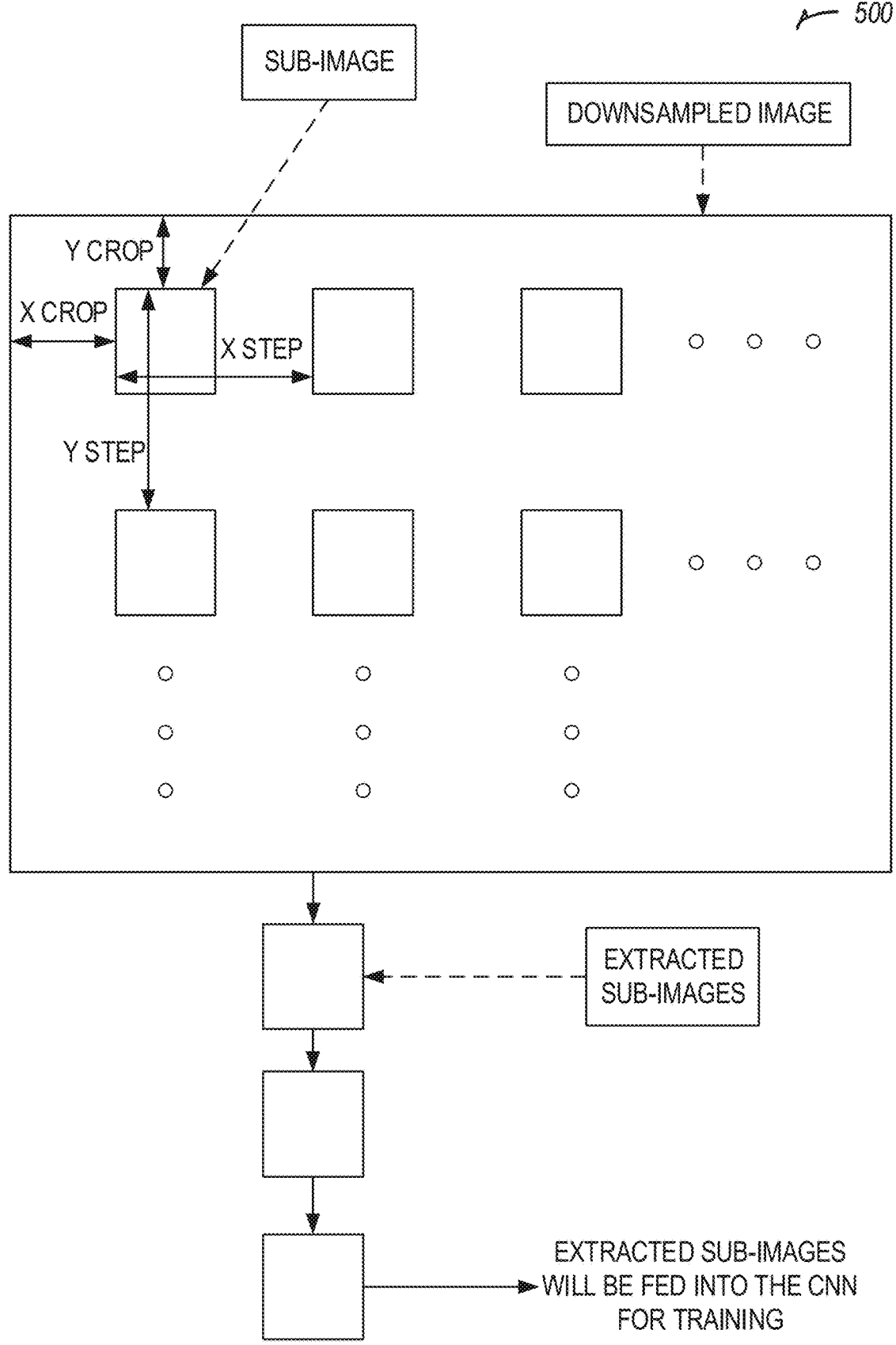
FIG. 5 illustrates an example image sub-image template in accordance with some embodiments.

FIG. 5 illustrates an example image sub-image template 500 in accordance with some embodiments. The template 500 includes a plurality of sub-images generated, for example, from a downsampled image. The sub-images are extracted from various regions of the image, and may be representative of the regions of the image. In an example, the sub-images are evenly distributed across the image. The sub-images may be used to train the model, or in an insight stage, with the model, to determine sharpness metrics or other image processing values.

The sub-image files may be labeled for training. For example, each input training image may be divided into hundreds or thousands of smaller sub-images (such as, 50×50, 100×100, 150×150, 500×500 pixels, or the like, and do not need to be square, but may include rectangular, 100×150, 150×50, etc.). The number of sub-images per image may be generated using configuration edge crop values and step size values in both the x and y directions. During insight, the number of sub-images may be selected by a user. By cropping away from edges, which are typical areas to see severe sharpness fall-off in images, potential low sharpness areas may be excluded from the sub-image selection. Each sub-image may be processed per its specified recipe and labeled according to the recipe rating.

Figure 6:
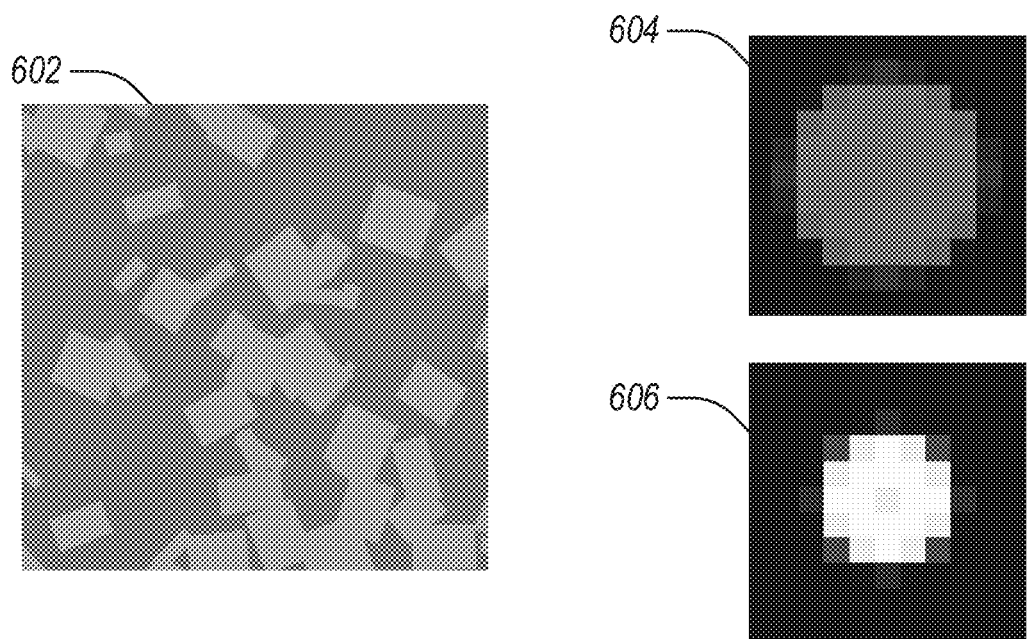
FIG. 6 illustrates example intermediate training images in accordance with some embodiments.

FIG. 6 illustrates example intermediate training images in accordance with some embodiments. A simulated image 602 may be used for training a model. As discussed above, simulated images are added with randomly placed shapes at differing gray levels. The simulated image 602 may be used to avoid noise and brightness level issues.

FIG. 6 illustrates image point spread function (PSF) blur kernel examples, for image blur simulations with different levels or types of image degradation. Kernels such as a circular blur kernel 604 or a ring blur kernel 606, as shown, or other kernels not shown, such as gaussian blur or linear blur may be used to blur images or sub-images for training a particular model. Kernels may be configured for a specified amount of blur or image degradation through a distance, standard deviation, or other configuration parameter. Images and sub-images are processed per a provided recipe (a list of image and sub-image operations) to simulate different levels of image degradation and augmentation. Image training recipes may include, circular blur, ring blur, gaussian blur, linear blur, flip operations, transpose operations, rotate operations, invert operations, noise injection, jpeg compression simulation, down sample, exposure, gray images, contrast stretching, or the like. Kernels with recipe specific levels of image or sub-image degradation may be generated for the associated convolution operation. The image degradation due to the convolution may be matched to an associated MTF50, RER, 10-90% edge response level, or other single value sharpness metric.

Blurring operation levels may be verified on a simulated edge image. A specific image generation recipe is created to generate a particular model. Image operation values may be pre-measured to assess impact on MTF50, and appropriate labels may be assigned to each operation according to its MTF50 value. A measurement may be evaluated by convolving the specific kernel filter with an edge and finding the MTF50 value or other single value sharpness metric.

When using MTF values (such as MTF50), the x and y MTF may be combined into a single value sharpness metric using the scaled arithmetic mean, for example according to Eq. 1, below.

$$\frac{\sqrt{2}}{\sqrt{\left(\frac{1}{xMTF}\right)^2 + \left(\frac{1}{yMTF}\right)^2}} \quad \text{Eq. 1}$$

In an example, a single operation that modifies the MTF50, RER, or 10-90% edge metric is used (e.g., the circular blur 604). In an example, one or more non-modifying operations (e.g., flip, invert, etc.) may be cascaded with the single operation. The operations are divided into two categories for efficient processing, including "Sub-image Operations" and "Image Operations" for determining when the operations are applied.

In an example, the recipes of operations are constructed to balance training at each MTF50 level. The generated sub-images may be sequence randomized, and for example put into 50,000 (configurable) sub-image data files with labels and recipes. An example model is trained using sub-images and associated labels generated from 9 levels of blur with MTF values of: 0.603, 0.402, 0.268, 0.179, 0.119, 0.079, 0.053, 0.035, and 0.024. The associated labels are 9, 8, 7, 6, 5, 4, 3, 2, and 1 (these levels may be reduced below 9 to improve performance and speed in specific applications). Random noise may be added to the sub-images to prevent the model being trained on the noise reduction (overfitting) due to the kernel operations. In an example, JPG simulation may be used for training so that the jpg artifacts are not impacting the rating level.

Gray sub-images (e.g., with random gray levels) may be added with a label of 0. This provides a "no-rating" value for areas with very little frequency content. Noise injection and jpg simulation may be performed on these gray sub-images. Random gains and image contrast adjustments may be added to better simulate the wide variety of real-world images and ensure the model does not develop a bias based on exposure level or contrast.

In an example, counter training may be used to ensuring the Optical System Blur (OSB) trained model and Motion Blur (MB) trained model are independent. For example, multiple fixed level of motion blur may be placed across all levels of OSB or circular blur may be added to all levels of MB model. Different training sub-image sets may be built for specific model requirements. In an example, OSB+MB may use the following settings for sub-image set generation:

7 class label levels corresponding to MTF50 ratings and 1 no-rating label
 Gaussian blur, circular blur, ring blur and linear blur PSF kernels with parameters calculated by measuring their effect on a simulated edge after downsampling
 4× downsampled PSF blurred base images including simulated random rectangle and circle images
 Random gaussian noise injection with 0 mean and 10 DN standard deviation
 Random JPG compression from 75%-95% applied to 50% of sub-images
 Uniform random gain adjustment from 0.75-1.25
 Uniform random contrast adjustment with the low-end stretch range of 0-25 DN and a high-end range of 230-255 DN Since sampling MTF (and therefore MTF50, RER, etc.) is dependent on edge positioning relative to the physical pixels (shift variant), the real-world MTF50 value may depend on the position of the imaging system to spatial frequency content in the imaged scene. One approach may be to average the sampling MTF impact into the measurement and utilize an average MTF50 measurement value. In some use cases, the average MTF50 value may be more representative of average real-world performance with randomly aligned subject matter, but it also may not match well with some standard sharpness measurement techniques. In practice, a lab or field measurement edge target may either be aligned with pixels, or oversampled, such that the peak MTF50 is the measured value. Therefore, peak MTF50 (not taking into account the alignment dependent sampling MTF contribution) may be chosen to best match common measurement techniques. Class labels used in AI training are linked to specific MTF50 values which in turn are linked to blur kernel operation parameters. For the case of a basic user where the absolute scientific scale is not important, more basic sequential numerical counts, colors, or, letters may be used in place of the actual MTF50 measurement. Table 1 illustrates an example:

TABLE 1

| CNN Class Label Standard Model | MTF50 (Peak cy/px) | Gauss PSF Sigma Pixels | Circular PSF Diameter Pixels | Ring50 PSF Outside Diameter Pixels | Linear PSF Distance Pixels |
|---|---|---|---|---|---|
| 7 | 0.603 | 0.001 | 1.001 | 1.001 | 0.001 |
| 6 | 0.402 | 1.431 | 5.451 | 4.821 | 5.559 |
| 5 | 0.268 | 2.519 | 9.541 | 8.391 | 10.616 |
| 4 | 0.179 | 3.977 | 15.011 | 13.201 | 17.301 |
| 3 | 0.119 | 6.059 | 22.831 | 20.041 | 26.676 |
| 2 | 0.079 | 9.077 | 34.171 | 29.991 | 40.274 |
| 1 | 0.053 | 13.459 | 50.661 | 44.451 | 60.014 |
| 0 | N/A | 20+ | 76+ | 67+ | 90+ |

Example Recipe Operation Sets

Operation Set Number: 52
  Rating Label: 4
  —Image Operations—
  Type: flip_lr
  Type: circular_blur
  Blur Diameter (pixels): 15.011
  Kernel Size (pixels): 17
  Resize Scale: 0.25
  —Chip Operations—
  Type: random_uniform_range_gauss_noise
  Noise Range DN: (0, 10)
  Set Noise Standard Deviation: 8.4
  Set Noise Mean: 0.0
  Type: random_exposure_adjustment
  Random Gain Multiplier Range: (0.75, 1.25)
  Set Gain Multiplier: 0.95
  Type: random_contrast_reduction
  Random Contrast Reduction Min Val Range: (0, 25)
  Random Contrast Reduction Max Val Range: (230, 255)
  Set Contrast Reduction Min Val: 21.76
  Set Contrast Reduction Max Val: 253.51
  Type: jpeg_artifact_simulation
  JPG Compression Range: (0.75, 0.95)
  JPG Application Fraction: 0.50
  JPG Compression Applied: False
  Set JPG Quality: 1.0
Operation Set Number: 131
  Rating Label: 2
  —Image Operations—
  Type: linear_blur_random_angle
  Blur Distance (pixels): 40.274
  Set Blur Angle (rad): 44.609
  Kernel Size (pixels): 43
  Resize Scale: 0.25
  —Sub-Image Operations—
  Type: random_uniform_range_gauss_noise
  Noise Range DN: (0, 10)
  Set Noise Standard Deviation: 5.6
  Set Noise Mean: 0.0
  Type: random_exposure_adjustment
  Random Gain Multiplier Range: (0.75, 1.25)
  Set Gain Multiplier: 0.91
  Type: random_contrast_reduction
  Random Contrast Reduction Min Val Range: (0, 25)
  Random Contrast Reduction Max Val Range: (230, 255)
  Set Contrast Reduction Min Val: 1.39
  Set Contrast Reduction Max Val: 239.13
  Type: jpeg_artifact_simulation
  JPG Compression Range: (0.75, 0.95)
  JPG Application Fraction: 0.50
  JPG Compression Applied: True
  Set JPG Quality: 0.9
  Type: rotate_90_deg_rand
  Rotation Application Factor: 0.00
  Rotation Applied: False
Operation Set Number: 160
  Rating Label: 0
  —Image Operations—
  Type: ring_blur
  Outside Blur Diameter (pixels): 150.022
  Inside Blur Diameter (pixels): 75.011
  Kernel Size (pixels): 151
  Resize Scale: 0.25
  —Sub-Image Operations—
  Type: random_uniform_range_gauss_noise
  Noise Range DN: (0, 10)
  Set Noise Standard Deviation: 2.7
  Set Noise Mean: 0.0
  Type: random_exposure_adjustment
  Random Gain Multiplier Range: (0.75, 1.25)
  Set Gain Multiplier: 1.20
  Type: random_contrast_reduction
  Random Contrast Reduction Min Val Range: (0, 25)
  Random Contrast Reduction Max Val Range: (230, 255)
  Set Contrast Reduction Min Val: 12.90
  Set Contrast Reduction Max Val: 230.97
  Type: jpeg_artifact_simulation
  JPG Compression Range: (0.75, 0.95)
  JPG Application Fraction: 0.50
  JPG Compression Applied: True
  Set JPG Quality: 0.8
  Type: rotate_90_deg_rand
  Rotation Application Factor: 0.20
  Rotation Applied: False In an example, the machine learning model may use a convolutional neural network (CNN). For example, a 3-layer CNN with 1-2 layer hidden neuron layers may be used. An activation function, such as a Rectified Linear Unit (ReLU) activation function, may be used within the CNN. MaxPooling after the CNN may be performed, for example with 4 areas per convolution output. A softmax classification may be used for the output layer. The size of each layer may vary by model design, for example including 32 7×7, 64 5×5, then 128 3×3 convolution filter layers followed by 512 feature output max pooling, then a 128 neuron layer and a 10 class softmax output layer, alternatively 32 7×7, 64 5×5, 128 3×3 convolution filter layers followed by 512 feature output max pooling, then a 128 neuron layer and an 8 class softmax output layers. An example output may include 5-10 classes of MTF50, RER, or 10-90% ER ratings depending on required sensitivity.

In an example, a distinct image kernel may be found for each type of blur PSF (e.g., gaussian, circular, etc.) and for each SVSM level for training. These PSF kernels may be found through an iterative process utilizing a simulated edge image. For example, the image may be convolved with a kernel, convolved with detector area and sampling functions, edge spread function may be extracted, single value sharpness metric may be calculated, and compared to a desired value, and this process may be iterated until a correct value is reached. Iteration may include constructing a blur/PSF kernel and returning to convolve the image with kernel. Each kernel/PSF and sharpness metric pairing may be output (e.g., 0.2680 peak MTF50 [cycles/pixel]=9.541 pixel diameter circular PSF kernel). Once all of the PSF and SVSM pairings have been found, simulated blur images may be generated from the available real-world source images.

Figure 7:
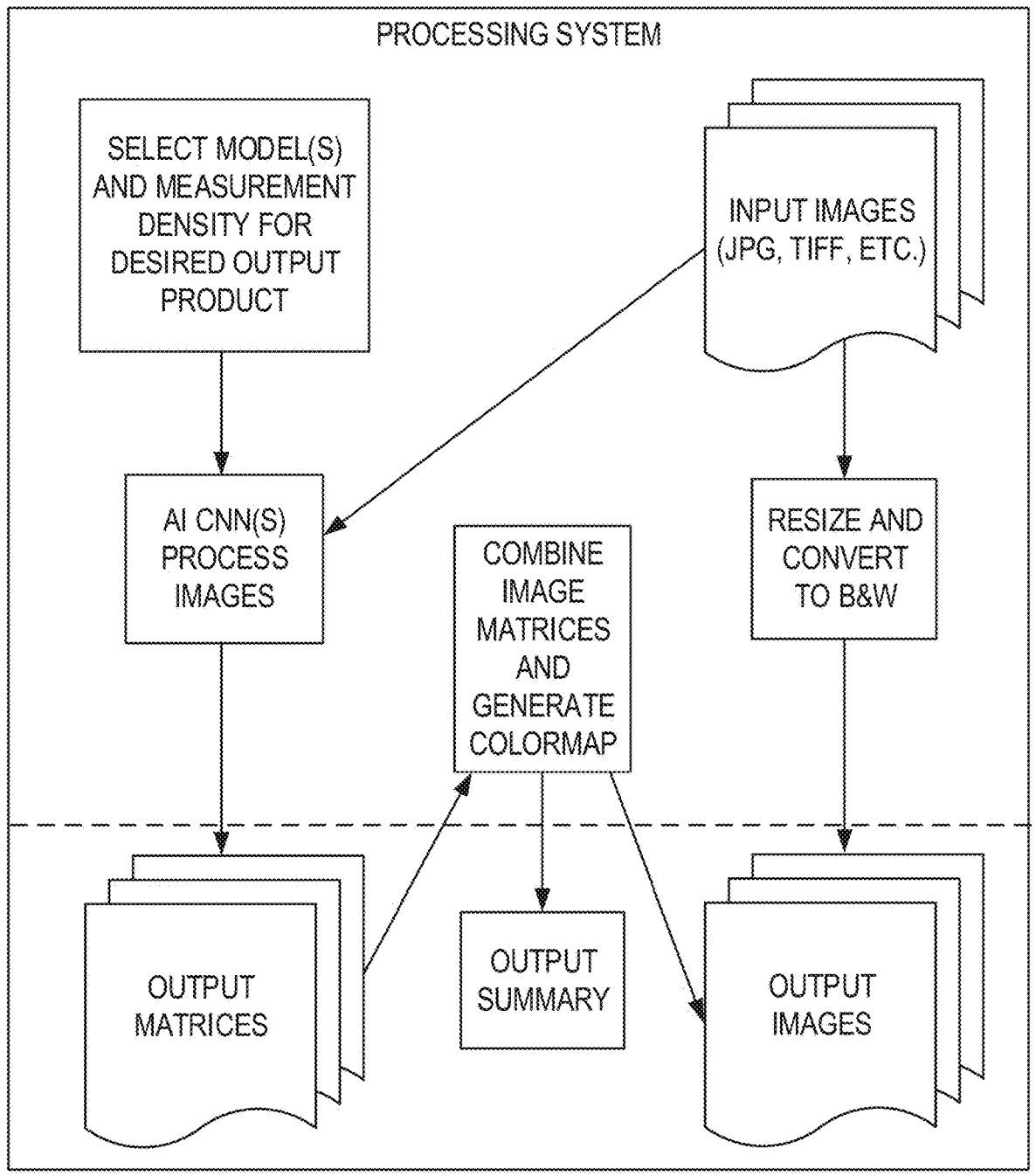
FIG. 7 illustrates an image processing block diagram in accordance with some embodiments.

FIG. 7 illustrates an image processing block diagram 700 in accordance with some embodiments. The image processing block diagram 700 may use a trained model as described above to classify an input image (e.g., by outputting a color map overlay, an output matrix of single value metrics, or the like). A model may be selected, such as an OSB model for defocus assessment, an MB for motion assessment, an OSB+MB model for overall blur assessment, an OSB+Noise for camera DQE, an OSB+MB+Noise for system (e.g., effective) DQE, or the like.

Optical system blur (OSB) may identify issues with a lens or camera system independent of movement, such as whether the camera is in focus even though the image is blurred due to movement. An example use for this technique includes identifying whether a camera is in focus on a moving imaging platform. Motion blur (MB) may be used to identify issues with a target or motion of a camera system, including vibration, such as how much blur is due to camera motion. OSB+MB together includes image sharpness detection, and may provide a simpler user experience (e.g., when compared to OSB or MB alone). The OSB+MB model may be used to determine whether the image sharpness is acceptable. Other models may be used to identify and output metrics relating to other aspects of image degradation such as noise, DQE, specific optical aberrations, or the like.

After the model is selected, the AI CNN may process an image or images (which may optionally be retrieved from a database), output a matrix, a color map overlay, or text summary. A resized or grayscale or black and white image version may be used with the color map overlay in an output image.

Figure 8:
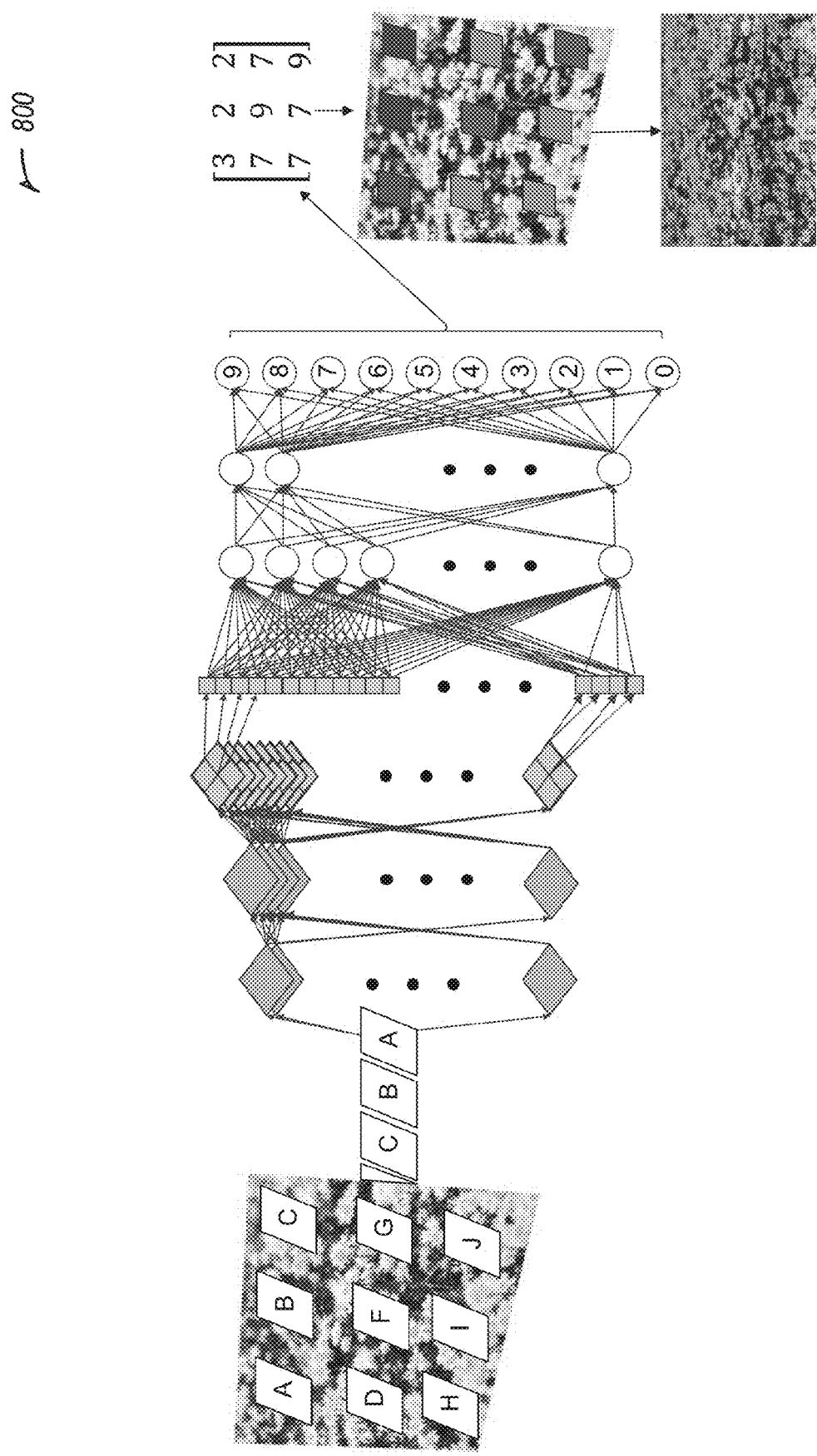
FIG. 8 illustrates a convolutional neural network flow diagram in accordance with some embodiments.

FIG. 8 illustrates a convolutional neural network flow diagram 800 in accordance with some embodiments. The CNN flow diagram 800 illustrates how a plurality of sub-images extracted from an image may be processed to generate a matrix or color map overlay indicating a single value sharpness metric or other metric. The plurality of sub-images (shown in the CNN flow diagram 800 as numbered 1-9, although hundreds or thousands of sub-images may be used) are sent through the layers of the CNN flow diagram 800. In an example, a number of convolutional filter layers may be used, followed by a max pooling layer, the one or more neuron layers before outputting a metric value corresponding to a respective sub-image.

The network topology of the CNN may be changed to adjust for performance or speed trade-offs, or selected by a user. For example, changes may include reducing or increasing convolutional layer filter numbers (e.g., layer 3 may be changed among 128 or 144 filters), eliminating a hidden neuron layer, or reducing neuron counts. The number of convolutional layers may be held at three, in an example.

Max pooling may be used to help enable sharpest edge measurement in a particular sub-image even when the sub-image is mostly without high frequency content. The pooling may reduce down to 4 areas where the max edge may occur and reduces computational complexity to a reasonable level. Hidden neuron layers may include 128, 64, 32 neurons, etc., for example with a 10% dropout per layer. The sub-images may be classified into an output class in a last layer. The class labels may be associated with a specific MTF50, RER, or 10-90% ER value in the output (e.g., a matrix, as shown in FIG. 8). The class labels may correspond to a color, which may be used to represent a region corresponding to a sub-image, and the colors may be used to color the regions in a color map overlay, which may be output for visual presentation.

Figure 9:
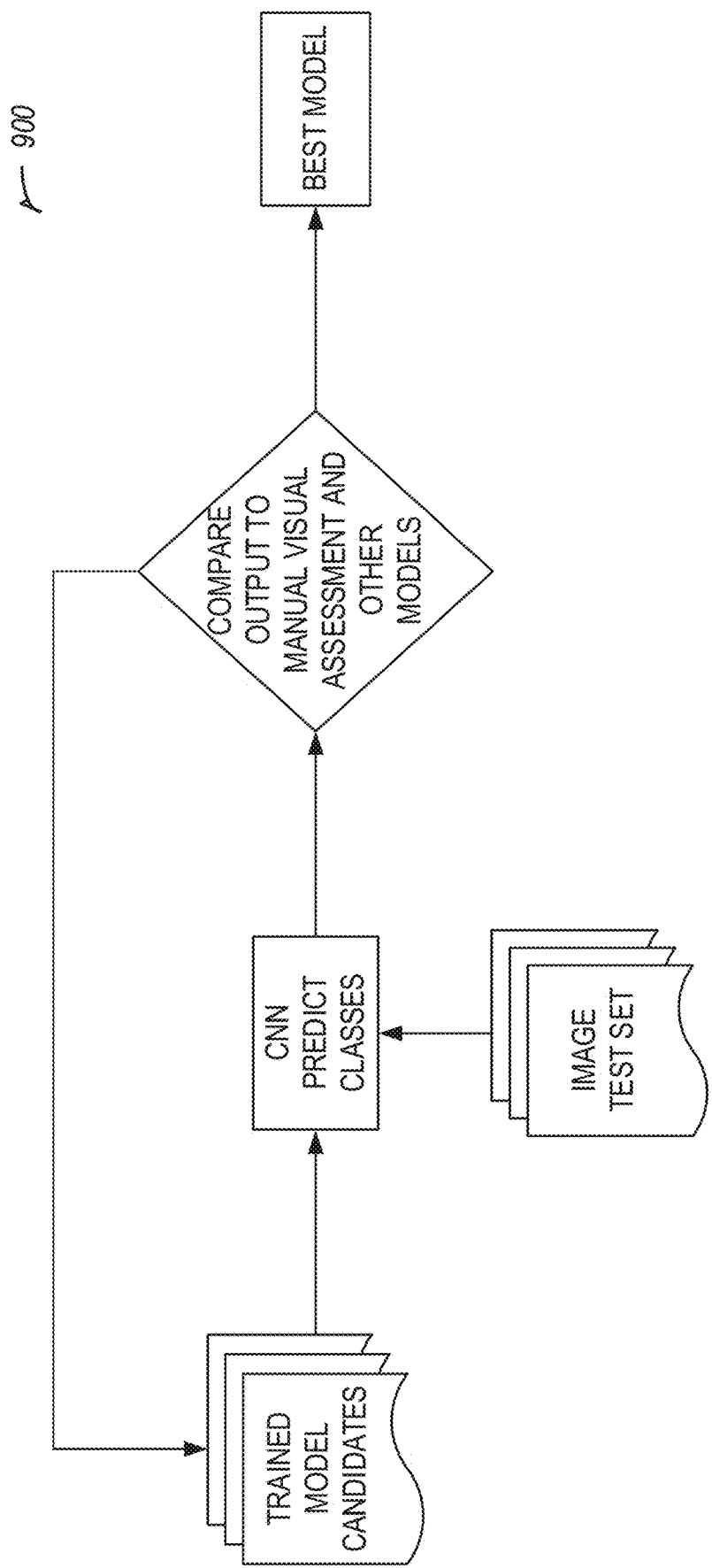
FIG. 9 illustrates a flowchart for selecting a candidate model in accordance with some embodiments.

FIG. 9 illustrates a flowchart 900 for selecting a candidate model in accordance with some embodiments. The flowchart 900 illustrates a training technique for outputting a best model for a particular use. A set of trained candidate models may be used with an image test set as inputs to a CNN model to predict classes. The output of the CNN model may be visually inspected or compared to other models (e.g., using confusion matrices) to identify a best model for example for a particular use. A recipe may be modified based on the selected best model.

A particular test set of images may be used, for example to cover a wide variety of challenging scene content and quality. An example confusion matrix may be linked to a given model. The matrix may be generated from separate sub-image data that was not part of the model training. The sub-images may be derived from the source image set.

Figure 10:
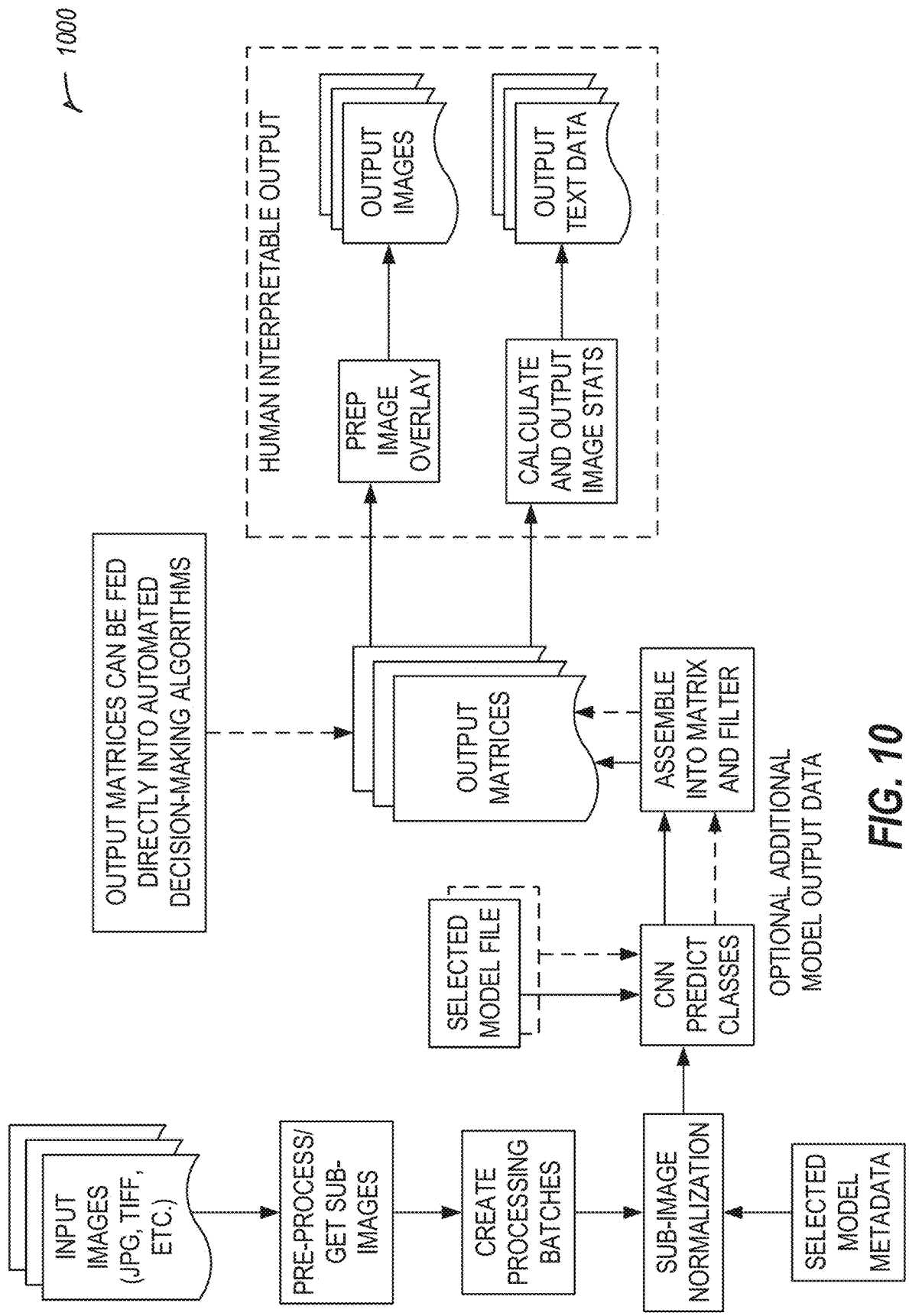
FIG. 10 illustrates an image processing flowchart in accordance with some embodiments.

FIG. 10 illustrates an image processing flowchart 1000 in accordance with some embodiments. The flowchart 1000 illustrates a detailed technique for image processing to produce an objective output related to blur or sharpness of an image.

For example, a user provides an image folder path containing one or more images. The input images may include any raster format image stored in formats such as tiff, jpeg, png, or the like. Non-images in the folder path may be ignored. In another example, one or more images may be selected individually to process. A maximum image size may be limited by computer system memory, or when using cloud-based processing, may be unlimited. In an example, a minimum size may be limited by a sub-image size, sub-image crop bounds, or spacing. In another example, an image may include as few as a single sub-image, and one single value metric may be output for that image. Images may include single or multiple bands, such 1-3 bands, grayscale to RGB or other multi-band imagery, which may be supported though single band selection. Images may include 8-bit integer, 16-bit integer, 16-bit float, 32-bit float, 64-bit float images, or the like.

In an example, an input image is converted to a grayscale image (e.g., RGB) or a band is selected (for multi-band images). A user configuration may be enabled to specify a number of sub-images to be extracted from the image for rating. The number of sub-images corresponds to a number of areas or regions in the image that are to be rated and used for applying a color map overlay.

The sub-images may be equally distributed horizontally and vertically according to a number of sub-images specified. In contrast to one of the example training sub-image extraction techniques, these sub-images may be extracted all the way to the edge of the image. In an example, extracted sub-image counts may range from 300 to 4800 per image (e.g., 20 by 15 to 80 by 60). The number of sub-images may depend on a desired rating density versus allowed processing time. In an example, the sub-images are converted to a standard float32 format on a 0-1 scale and stacked for the CNN processing and rating prediction using the CNN model. The sub-images may be divided up into batches for processing based on user specification or available RAM and GPU memory. Batching allows for faster processing than handing individual sub-images to the CPU for normalization and to the GPU for class prediction, for example.

Before the sub-image batch is fed into the CNN, it may be normalized and scaled per the training data. Using a provided metadata file (e.g., as saved during model training), the range of the training values, average, and standard deviation images may be loaded and then used to adjust the sub-images (normalizing and scaling the sub-images). The mean image may be subtracted from each sub-image and then divided by the standard deviation image, according to an example. The result may be scaled from 0 to 1 using min and max bounds from the training data, which may be stored in the metadata file or otherwise made available.

The normalized batch of images may be fed into the CNN for class prediction. After each sub-image has been run through the CNN and given its rating classification, the rating may be placed into a matrix matching the sub-image location in the associated image. Matrices may be filtered, such as by using a 5×5 median filter to reduce the rating noise.

In a specific example, an image matrix with an associated rating classification number may be stacked into an array for numerical computing (and one or both of the filtered and unfiltered versions may be stored). The arrays are saved to a file with the reference image names and file paths. The image rating matrices may be loaded from the saved file or passed along via a loaded class in memory.

In an example, the rating matrix is combined with other generated rating matrices for the same image (OSB+MB) into a single matrix per image. The matrix for a given image may be treated as a raster image and scaled up to the size of the original full-size reference image using nearest neighbor or cubic interpolation, for example. The full-size matrix raster image is colorized by rescaling the values (e.g., from 0-255) and applying a set color mask.

Gray levels, which correspond to no-rating classifications, may be masked out and set to gray. The new scaled colorized matrix image may be overlaid on top of the reference grayscale image (e.g., generated from an input image). This color overlay image may be saved.

In an example, statistics may be output, such as rating averages, MTF50, RER, or 10-90% ER, % of an image. These statistics may be calculated from a loaded file or from a loaded class in memory to give a user a quick overview of the image rating and system performance.

Figure 11A:
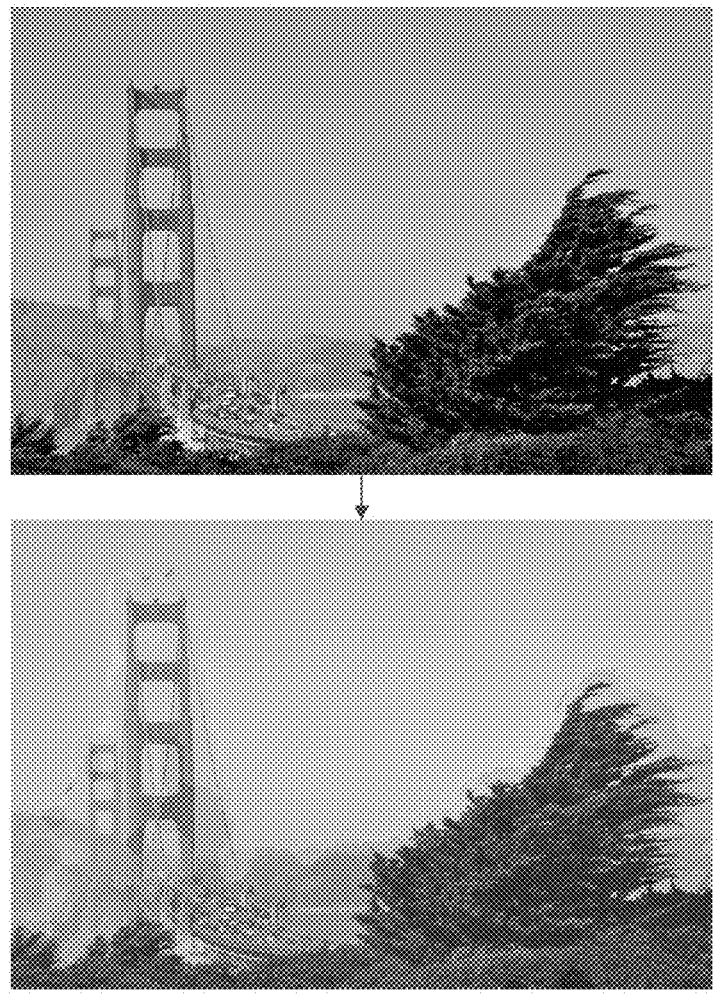
FIGS. 11A-11E illustrate example outputs of color map overlays in accordance with some embodiments.

FIGS. 11A-E illustrate example outputs of color map overlays in accordance with some embodiments. FIG. 11A includes a color image and a grayscale image with a color map overlay. FIG. 11A illustrates an input image (top) and an output image (bottom) that includes a grayscale version of the input image with an overlaid color map indicating sharpness values in the input image. Gray areas in the output image correspond to regions of the input image that have a no-rating classification for sharpness, for example because a classification is not accurately determinable, such as due to image scene content being minimal or non-existent (e.g., solid blue sky in the input image of FIG. 11A). These regions are difficult, if not impossible, to rate, even with advanced AI techniques. Instead of guessing, interpolating, or labeling those areas as poor, the image processing techniques described herein identify these areas as no-rating and colors them gray or does not apply any color overlay.

The output image includes no-rating regions that are less of a distraction from the overall image characteristics and easier to interpret. Downstream processing of the output data is easier for commercial applications when the no-rating classification is applied rather than other techniques. Example poor scene content (low frequency and contrast content) may include a blue sky, a blank wall, clouds, etc.

In an example, colors may correspond to output values from a CNN. For example, 0.179 cycles/pixel MTF50 may be a reasonable "good enough" level of sharpness in some applications. An MTF50 of 0.179, therefore, may correspond to a green output. For more advanced users or uses, a higher level is may be needed, and for example, an MTF50 of 0.402 may correspond to green (e.g., where green is a middle color in the color spectrum range).

In an example, a user may choose to output the image overlay color map as discrete classes (colors) or to use the full color scale interpolated across class/rating boundaries. Table 2 illustrates an example MTF50 scale with color descriptions, and corresponding ratings and color values.

TABLE 2

| CNN Class Labels | | MTF50 (Peak cy/px) 0-1 Scale | Color Description | sRGB | | |
|---|---|---|---|---|---|---|
| Standard Model | Optional Extended Model | | | R | G | B |
| 7 | 9 | 0.603 | Purple | 84 | 0 | 127 |
| 6 | 8 | 0.402 | Blue | 0 | 20 | 255 |
| 5 | 7 | 0.268 | Light Blue | 0 | 166 | 255 |
| 4 | 6 | 0.179 | Green | 52 | 255 | 202 |
| 3 | 5 | 0.119 | Yellow | 202 | 255 | 52 |
| 2 | 4 | 0.079 | Orange | 255 | 166 | 0 |
| 1 | 3 | 0.053 | Red | 255 | 20 | 0 |
| N/A | 2 | 0.035 | Dark Red | 207 | 0 | 0 |
| N/A | 1 | 0.024 | Very Dark Red | 151 | 0 | 0 |
| 0 | 0 | N/A | Gray | 171 | 171 | 171 |

The colormap overlay has multiple output interpolation options. An example default may include a custom cubic interpolation which limits the rating to discrete levels (similar to image segmentation). In another example, a cubic interpolation that allows a continuous color mapping may be used. The colormap may be defined for the entire continuous 8-bit range.

Figure 11B:
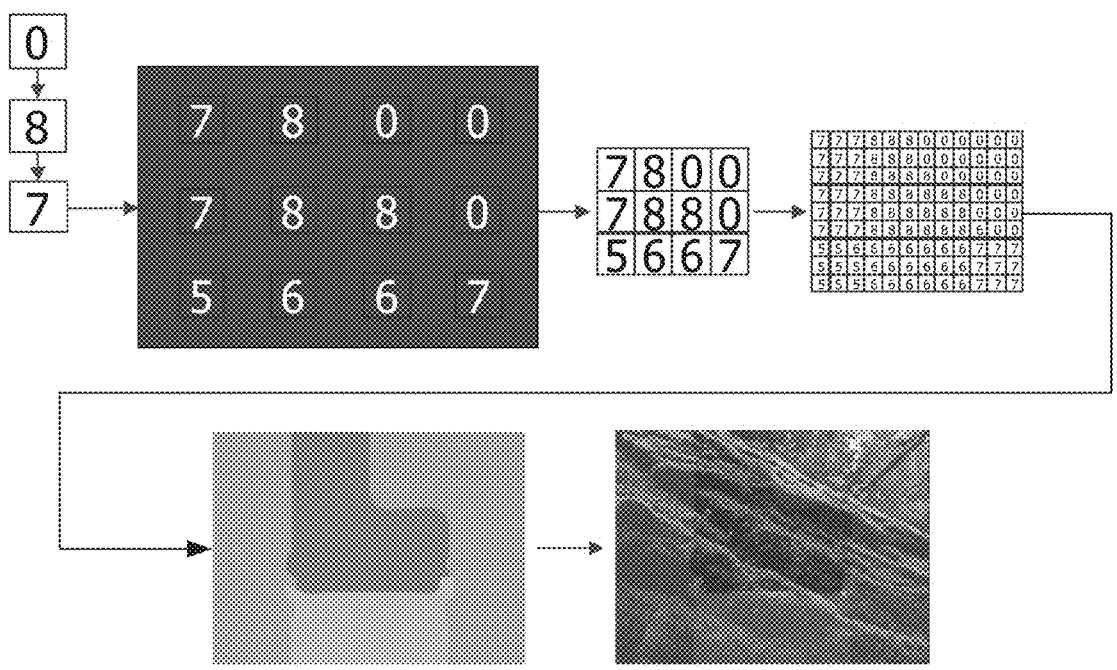

FIG. 11B illustrates an example of a technique for predicting sub-image classes that are re-assembled into a matrix with appropriate original sub-image location layout. The sub-images may be applied to a rating matrix raster image, and upscaled and interpolated (e.g., with "Close" Boundary Limitation). The resulting matrix may use a rating color look up table (LUT) to create a color overlay image, which may be overlaid onto the original image.

Figure 11C:
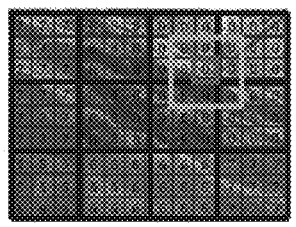

FIG. 11C illustrates an example rating matrix that is constructed and cubic interpolated (e.g., upscaled) to original input image dimensions. Interpolated values may be limited to available classes that are "close". A standard cubic interpolation may result in floating point values outside of the original classes, and the closest class within the local area may be selected instead (e.g., 3 by 3 sub-image area centered around current sub-image rating). FIG. 11C shows an example 3×3 area of class option boundary limitation surrounding an area to be interpolated.

Figure 11D:
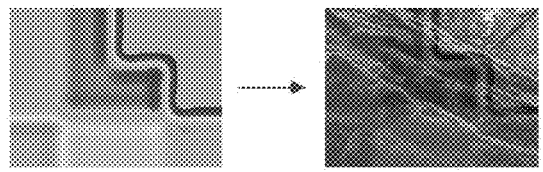
Figure 11E:
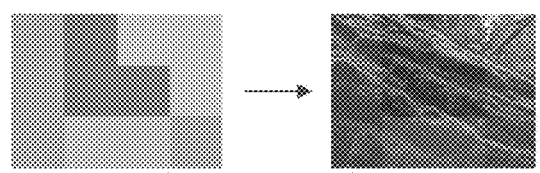

FIG. 11D illustrates an example a cubic with issues at boundaries between rating and no-rating classification regions. This sub-image interpolated value selection limitation is particularly important for high rating areas next to no-rating areas. Without this local area selection limitation, the interpolation may create a full gradient of all ratings between the high value and 0 creating a rainbow effect near no-rating areas. FIG. 11D illustrates an example with cubic interpolation and no boundary limitation. FIG. 11E illustrates an example with nearest neighbor interpolation, which may result in "blocky" output that is less visually appealing in many cases. The Example of FIG. 11B illustrates a smoother, more visually appealing result over the examples of FIGS. 11D-E. As the number of rated areas and the size of the source image increases the visual advantages of the boundary and class limited cubic interpolation become more visually apparent.

Figure 12:
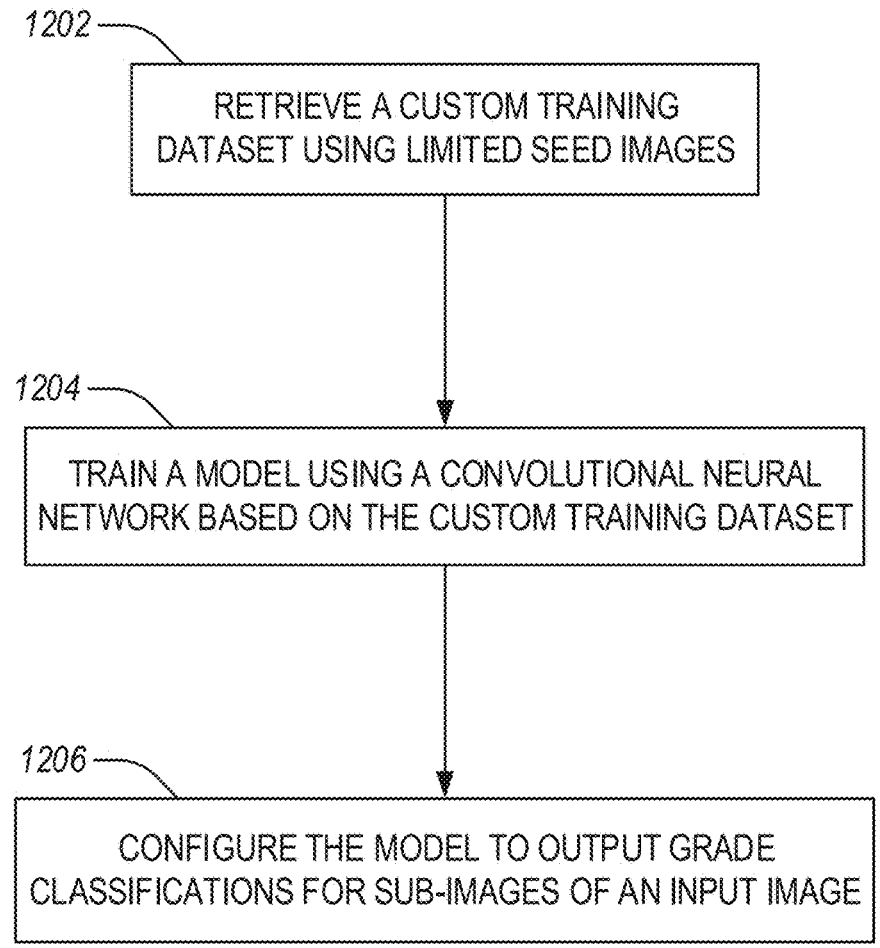
FIG. 12 illustrates a flowchart showing a technique for training a machine learning model for image processing in accordance with some embodiments.

FIG. 12 illustrates a flowchart illustrating a technique 1200 for training a machine learning model for image processing in accordance with some embodiments.

The technique 1200 includes an operation 1202 to retrieve a custom training dataset using limited seed images. The custom training dataset may be stored in a database, generated from images, or may include labeled or testing data. Selected images may be labeled according to focus or other image feature across the image and may include varying scene content. In an example, the training dataset may include frequency content everywhere in the image such that each sub-image contains a minimum amount of spatial variation.

The technique 1200 includes an operation 1204 to train a model using a convolutional neural network (CNN) based on the custom training dataset. The CNN includes a plurality of layers, as described above.

The technique 1200 includes an operation 1206 to configure the model to output rating classifications for sub-images of an input image. The rating classifications may include a no-rating classification (e.g., for region of an image that have unknown or indeterminate single value metrics).

Figure 13:
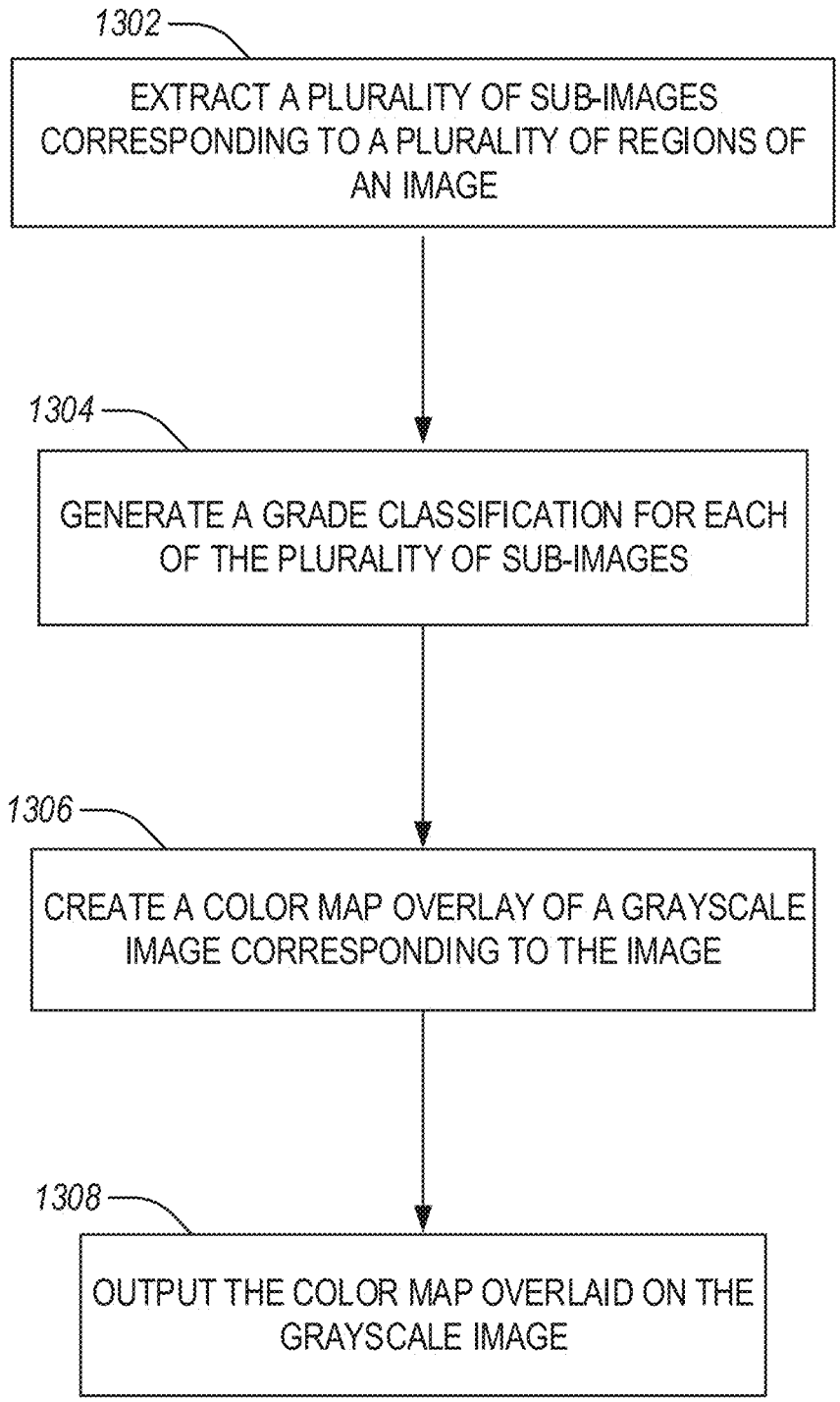
FIG. 13 illustrates a flowchart showing a technique for performing image processing in accordance with some embodiments.

FIG. 13 illustrates a flowchart illustrating a technique 1300 for performing image processing in accordance with some embodiments. The technique 1300 includes an operation 1302 to extract a plurality of sub-images corresponding to a plurality of regions of an image, for example using a processor.

The technique 1300 includes an operation 1304 to generate a rating classification for each of the plurality of sub-images, including optionally a no-rating classification for at least one sub-image of the plurality of sub-images. In an example, the rating classifications include a single value metric, such as a single value sharpness metric. The technique 1300 may include outputting a matrix including respective absolute values of a plurality of single value sharpness metrics aligned according to an alignment of the plurality of regions of the image.

The technique 1300 includes an operation 1306 to create a color map overlay of a grayscale image corresponding to the image, for example using the rating classification for each of the plurality of sub-images. The color map overlay may include colors corresponding to respective rating classifications for the plurality of regions, and in an example, including a region without a color corresponding to the at least one sub-image having the no-rating classification. The color map overlay may correspond to sharpness within the image. The colors of the color map overlay may represent absolute values of sharpness. The color may overlay may include interpolated colors representing rating classification boundaries (e.g., region boundaries).

The technique 1300 includes an operation 1308 to output the color map overlaid on the grayscale image. The technique 1300 may further include creating a set of rating classifications for a second plurality of sub-images of a second grayscale image corresponding to a second image, comparing the set of rating classifications for the second grayscale image to the rating classification for each of the plurality of sub-images of the grayscale image, and outputting a comparison of relative sharpness between the image and the second image. The technique 1300 may further include outputting a motion blur rating for the image based on the color map overlay.

The trained model may be trained using a custom training dataset that is generated using limited seed images. The trained model may include a CNN. In an example, a total number of sub-images used in the plurality of sub-images is user selected. The technique 1300 may further include before generating the rating classification using the machine learning trained model, normalizing or scaling the plurality of sub-images based on training data from training the trained model.

The technique 1300 may further include estimating a modulation transfer function 50% contrast spatial frequency (MTF50) value for the image and outputting the MTF50 value. In an example, the technique 1300 further includes determining a distance value.

In an example, single value sharpness metrics may include MTF50, RER, 10% to 90% edge response value, Q-effective, 'MTF integrated area', or the like. For example: MTF % includes modulation transfer function frequency at X % contrast value. MTF50 is one example with frequency at 50% contrast, and MTF10, MTF90, etc. may be used. RER includes a 0.5 pixel contrast difference (slope of edge spread function near edge). X-Y % Edge Response includes a distance from X % to Y % of the edge spread function (ESF), for example 10-90%, other combinations may be configured as well. MTF Area includes modulation transfer function integrated area. Q-Effective may be derived from the line spread function (LSF). In an example, a Strehl Ratio may be used with MTF Area.

Each of these metrics have advantages and disadvantages in different application spaces. In an example, the metrics may be mathematically related by Eqs. 2 and 3:

$$LSF = \frac{d}{dx}(ESF) \qquad \text{Eq. 2}$$

$$MTF = |\mathcal{F}\{LSF\}| = \left|\int_{-\infty}^{\infty}(LSF)*e^{-2\pi i \xi x}dx\right| \qquad \text{Eq. 3}$$

Figure 14:
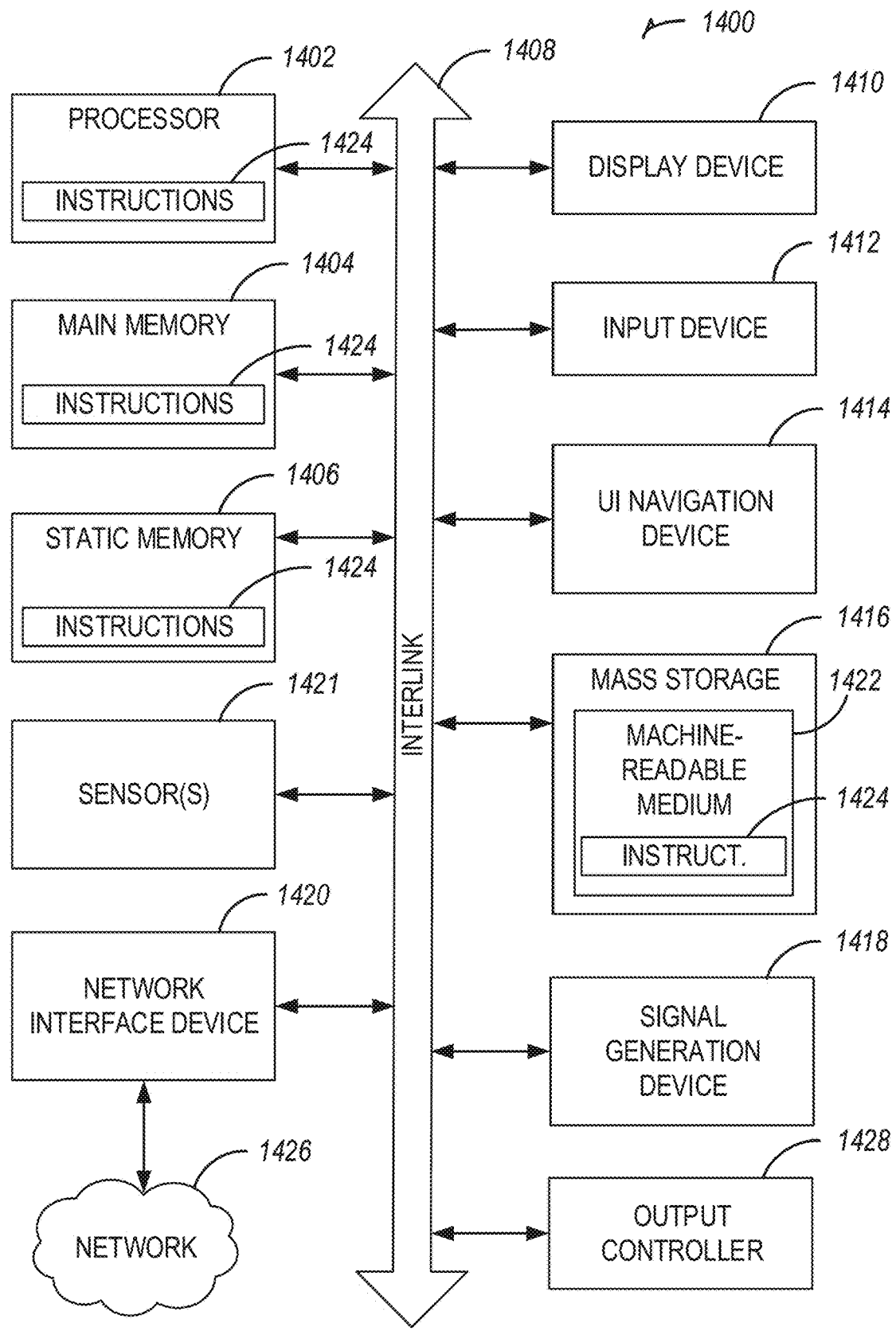
FIG. 14 illustrates a block diagram of an example machine upon which any one or more of the techniques discussed herein may perform in accordance with some embodiments.

FIG. 14 illustrates a block diagram of an example machine 1400 upon which any one or more of the techniques discussed herein may perform in accordance with some embodiments. In alternative embodiments, the machine 1400 may operate as a standalone device or may be connected (e.g., networked) to other machines. In a networked deployment, the machine 1400 may operate in the capacity of a server machine, a client machine, or both in server-client network environments. In an example, the machine 1400 may act as a peer machine in peer-to-peer (P2P) (or other distributed) network environment. The machine 1400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 1400 may include a hardware processor 1402 (e.g., a central processing unit (CPU), a graphics processing unit (GPU), a hardware processor core, or any combination thereof), a main memory 1404 and a static memory 1406, some or all of which may communicate with each other via an interlink (e.g., bus) 1408. The machine 1400 may further include a display unit 1410, an alphanumeric input device 1412 (e.g., a keyboard), and a user interface (UI) navigation device 1414 (e.g., a mouse). In an example, the display unit 1410, input device 1412 and UI navigation device 1414 may be a touch screen display. The machine 1400 may additionally include a storage device (e.g., drive unit) 1416, a signal generation device 1418 (e.g., a speaker), a network interface device 1420, and one or more sensors 1421, such as a global positioning system (GPS) sensor, compass, accelerometer, or other sensor. The machine 1400 may include an output controller 1428, such as a serial (e.g., Universal Serial Bus (USB), parallel, or other wired or wireless (e.g., infrared (IR), near field communication (NFC), etc.) connection to communicate or control one or more peripheral devices (e.g., a printer, card reader, etc.).

The storage device 1416 may include a machine readable medium 1422 on which is stored one or more sets of data structures or instructions 1424 (e.g., software) embodying or utilized by any one or more of the techniques or functions described herein. The instructions 1424 may also reside, completely or at least partially, within the main memory 1404, within static memory 1406, or within the hardware processor 1402 during execution thereof by the machine 1400. In an example, one or any combination of the hardware processor 1402, the main memory 1404, the static memory 1406, or the storage device 1416 may constitute machine readable media.

While the machine readable medium 1422 is illustrated as a single medium, the term "machine readable medium" may include a single medium or multiple media (e.g., a centralized or distributed database, and/or associated caches and servers) configured to store the one or more instructions 1424. The term "machine readable medium" may include any medium that is capable of storing, encoding, or carrying instructions for execution by the machine 1400 and that cause the machine 1400 to perform any one or more of the techniques of the present disclosure, or that is capable of storing, encoding or carrying data structures used by or associated with such instructions. Non-limiting machine-readable medium examples may include solid-state memories, and optical and magnetic media.

The instructions 1424 may further be transmitted or received over a communications network 1426 using a transmission medium via the network interface device 1420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.1 family of standards known as Wi-Fi®, IEEE 802.16 family of standards known as WiMax®), IEEE 802.15.4 family of standards, peer-to-peer (P2P) networks, among others. In an example, the network interface device 1420 may include one or more physical jacks (e.g., Ethernet, coaxial, or phone jacks) or one or more antennas to connect to the communications network 1426. In an example, the network interface device 1420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1400, and includes digital or analog communications signals or other intangible medium to facilitate communication of such software.

Each of these non-limiting examples may stand on its own, or may be combined in various permutations or combinations with one or more of the other examples.

Example 1 is a method comprising: extracting a plurality of sub-images corresponding to a plurality of regions of an image: generating, using a machine learning trained model, a rating classification for each of the plurality of sub-images including a no-rating classification for at least one sub-image of the plurality of sub-images; creating, using the rating classification for each of the plurality of sub-images, a color map overlay of a grayscale image corresponding to the image, the color map overlay including colors corresponding to respective rating classifications for the plurality of regions and including a region without a color corresponding to the at least one sub-image having the no-rating classification; and outputting the color map overlaid on the grayscale image.

In Example 2, the subject matter of Example 1 includes, wherein the rating classifications for each of the plurality of sub-images include a plurality of single value sharpness metrics, and further comprising outputting a matrix including respective absolute values of the plurality of single value sharpness metrics aligned according to an alignment of the plurality of regions of the image.

In Example 3, the subject matter of Examples 1-2 includes, wherein the color map overlay corresponds to sharpness within the image.

In Example 4, the subject matter of Example 3 includes, wherein the colors of the color map overlay represent absolute values of sharpness.

In Example 5, the subject matter of Example 4 includes, creating a set of rating classifications for a second plurality of sub-images of a second grayscale image corresponding to a second image; comparing the set of rating classifications for the second grayscale image to the rating classification for each of the plurality of sub-images of the grayscale image; outputting a comparison of relative sharpness between the image and the second image.

In Example 6, the subject matter of Examples 1-5 includes, outputting a motion blur rating for the image based on the color map overlay.

In Example 7, the subject matter of Examples 1-6 includes, wherein the trained model is trained using a custom training dataset that is generated using limited seed images.

In Example 8, the subject matter of Examples 1-7 includes, wherein the trained model includes a convolutional neural network.

In Example 9, the subject matter of Examples 1-8 includes, wherein a total number of sub-images used in the plurality of sub-images is user selected.

In Example 10, the subject matter of Examples 1-9 includes, before generating the rating classification using the machine learning trained model, normalizing and scaling the plurality of sub-images based on training data from training the trained model.

In Example 11, the subject matter of Examples 1-10 includes, wherein the color map overlay includes interpolated colors representing rating classification boundaries.

Example 12 is at least one machine-readable medium, including instructions, which when executed by a processor, cause the processor to perform operations to: extract a plurality of sub-images corresponding to a plurality of regions of an image; generate, using a machine learning trained model, a rating classification for each of the plurality of sub-images including a no-rating classification for at least one sub-image of the plurality of sub-images; create, using the rating classification for each of the plurality of sub-images, a color map overlay of a grayscale image corresponding to the image, the color map overlay including colors corresponding to respective rating classifications for the plurality of regions and including a region without a color corresponding to the at least one sub-image having the no-rating classification; and output the color map overlaid on the grayscale image.

In Example 13, the subject matter of Example 12 includes, wherein the rating classifications for each of the plurality of sub-images include a plurality of single value sharpness metrics, and wherein the instructions further cause the processor to output a matrix including respective absolute values of the plurality of single value sharpness metrics aligned according to an alignment of the plurality of regions of the image.

In Example 14, the subject matter of Examples 12-13 includes, wherein the color map overlay corresponds to sharpness within the image.

In Example 15, the subject matter of Example 14 includes, wherein the colors of the color map overlay represent absolute values of sharpness.

In Example 16, the subject matter of Example 15 includes, wherein the instructions further cause the processor to: create a set of rating classifications for a second plurality of sub-images of a second grayscale image corresponding to a second image; compare the set of rating classifications for the second grayscale image to the rating classification for each of the plurality of sub-images of the grayscale image; output a comparison of relative sharpness between the image and the second image.

In Example 17, the subject matter of Examples 12-16 includes, wherein the instructions further cause the processor to output a motion blur rating for the image based on the color map overlay.

In Example 18, the subject matter of Examples 12-17 includes, wherein the trained model is trained using a custom training dataset that is generated using limited seed images.

In Example 19, the subject matter of Examples 12-18 includes, wherein the trained model includes a convolutional neural network.

In Example 20, the subject matter of Examples 12-19 includes, wherein a total number of sub-images used in the plurality of sub-images is user selected.

In Example 21, the subject matter of Examples 12-20 includes, wherein the instructions further cause the processor to, before generating the rating classification using the machine learning trained model, normalize and scaling the plurality of sub-images based on training data from training the trained model.

In Example 22, the subject matter of Examples 12-21 includes, wherein the color map overlay includes interpolated colors representing rating classification boundaries.

Example 23 is a system comprising: a processor and memory, including instructions, which when executed by the processor, cause the processor to perform operations to: extract a plurality of sub-images corresponding to a plurality of regions of an image; generate, using a machine learning trained model, a rating classification for each of the plurality of sub-images, wherein the rating classification is one of a plurality of rating classifications including a no-rating classification; create, using the rating classification for each of the plurality of sub-images, a color map overlay of a grayscale image corresponding to the image, the color map overlay including colors corresponding to respective rating classifications for the plurality of regions or a region without a color corresponding to the no-rating classification; and output the color map overlaid on the grayscale image.

In Example 24, the subject matter of Example 23 includes, wherein the machine learning trained model is trained based on a selection of in-focus real-world source images used to generate sharpness base images that are convolved with a point spread function at a specific single value sharpness metric (SVSM) value.

In Example 25, the subject matter of Example 24 includes, wherein multiple sub-images are extracted from each convolved source image and infused with random noise to create a set of augmented training images.

Example 26 is at least one machine-readable medium including instructions that, when executed by processing circuitry, cause the processing circuitry to perform operations to implement of any of Examples 1-25.

Example 27 is an apparatus comprising means to implement of any of Examples 1-25.

Example 28 is a system to implement of any of Examples 1-25.

Example 29 is a method to implement of any of Examples 1-25.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A method comprising:
   extracting, using a processor, a plurality of sub-images corresponding to a plurality of regions of an image;

generating, using a machine learning trained model, a rating classification for each of the plurality of sub-images including a no-rating classification for at least one sub-image of the plurality of sub-images;

creating, using the rating classification for each of the plurality of sub-images, a color map overlay of a grayscale image corresponding to the image, the color map overlay including colors corresponding to respective rating classifications for the plurality of regions and including a region without a color corresponding to the at least one sub-image having the no-rating classification; and outputting the color map overlaid on the grayscale image.

2. The method of claim 1, wherein the rating classifications for each of the plurality of sub-images include a plurality of single value sharpness metrics, and further comprising outputting a matrix including respective absolute values of the plurality of single value sharpness metrics aligned according to an alignment of the plurality of regions of the image.

3. The method of claim 1, wherein the color map overlay corresponds to sharpness within the image.

4. The method of claim 3, wherein the colors of the color map overlay represent absolute values of sharpness.

5. The method of claim 4, further comprising:
creating a set of rating classifications for a second plurality of sub-images of a second grayscale image corresponding to a second image;
comparing the set of rating classifications for the second grayscale image to the rating classification for each of the plurality of sub-images of the grayscale image;
outputting a comparison of relative sharpness between the image and the second image.

6. The method of claim 1, further comprising outputting a motion blur rating for the image based on the color map overlay.

7. The method of claim 1, wherein the trained model is trained using a custom training dataset that is generated using limited seed images.

8. The method of claim 1, wherein the trained model includes a convolutional neural network.

9. The method of claim 1, wherein a total number of sub-images used in the plurality of sub-images is user selected.

10. The method of claim 1, further comprising, before generating the rating classification using the machine learning trained model, normalizing and scaling the plurality of sub-images based on training data from training the trained model.

11. The method of claim 1, wherein the color map overlay includes interpolated colors representing rating classification boundaries.

12. At least one non-transitory machine-readable medium, including instructions, which when executed by a processor, cause the processor to perform operations to:
extract a plurality of sub-images corresponding to a plurality of regions of an image;
generate, using a machine learning trained model, a rating classification for each of the plurality of sub-images including a no-rating classification for at least one sub-image of the plurality of sub-images;
create, using the rating classification for each of the plurality of sub-images, a color map overlay of a grayscale image corresponding to the image, the color map overlay including colors corresponding to respective rating classifications for the plurality of regions and including a region without a color corresponding to the at least one sub-image having the no-rating classification; and
output the color map overlaid on the grayscale image.

13. The at least non-transitory one machine-readable medium of claim 12, wherein the rating classifications for each of the plurality of sub-images include a plurality of single value sharpness metrics, and wherein the instructions further cause the processor to output a matrix including respective absolute values of the plurality of single value sharpness metrics aligned according to an alignment of the plurality of regions of the image.

14. The at least one non-transitory machine-readable medium of claim 12, wherein the color map overlay corresponds to sharpness within the image.

15. The at least one non-transitory machine-readable medium of claim 14, wherein the colors of the color map overlay represent absolute values of sharpness.

16. The at least one non-transitory machine-readable medium of claim 15, wherein the instructions further cause the processor to:
create a set of rating classifications for a second plurality of sub-images of a second grayscale image corresponding to a second image;
compare the set of rating classifications for the second grayscale image to the rating classification for each of the plurality of sub-images of the grayscale image;
output a comparison of relative sharpness between the image and the second image.

17. The at least one non-transitory machine-readable medium of claim 12, wherein the instructions further cause the processor to output a motion blur rating for the image based on the color map overlay.

18. The at least one non-transitory machine-readable medium of claim 12, wherein the trained model is trained using a custom training dataset that is generated using limited seed images.

19. The at least one non-transitory machine-readable medium of claim 12, wherein the trained model includes a convolutional neural network.

20. The at least one non-transitory machine-readable medium of claim 12, wherein a total number of sub-images used in the plurality of sub-images is user selected.

21. The at least one non-transitory machine-readable medium of claim 12, wherein the instructions further cause the processor to, before generating the rating classification using the machine learning trained model, normalize and scaling the plurality of sub-images based on training data from training the trained model.

22. The at least one non-transitory machine-readable medium of claim 12, wherein the color map overlay includes interpolated colors representing rating classification boundaries.

23. A system comprising:
a processor and memory, including instructions, which when executed by the processor, cause the processor to perform operations to:
extract a plurality of sub-images corresponding to a plurality of regions of an image;
generate, using a machine learning trained model, a rating classification for each of the plurality of sub-images, wherein the rating classification is one of a plurality of rating classifications including a no-rating classification;
create, using the rating classification for each of the plurality of sub-images, a color map overlay of a grayscale image corresponding to the image, the color map overlay including colors corresponding to respective rating classifications for the plurality of regions or a region without a color corresponding to the no-rating classification; and output the color map overlaid on the grayscale image.

24. The system of claim 23, wherein the machine learning trained model is trained based on a selection of in-focus real-world source images used to generate sharpness base images that are convolved with a point spread function at a specific single value sharpness metric (SVSM) value and downsampled.

25. The system of claim 24, wherein multiple sub-images are extracted from each convolved downsampled source image and infused with random noise to create a set of augmented training images.

* * * * *